(12) United States Patent
Jackson et al.

(10) Patent No.: US 6,467,598 B2
(45) Date of Patent: Oct. 22, 2002

(54) SYNCHRONIZER

(75) Inventors: Graeme Andrew Jackson, Bolton; Carl Christopher John Smith, Chorley, both of (GB)

(73) Assignee: Eaton Corporation, Cleveland, OH (US)

( * ) Notice: Subject to any disclaimer, the term of this patent is extended or adjusted under 35 U.S.C. 154(b) by 24 days.

(21) Appl. No.: 09/733,657

(22) Filed: Dec. 8, 2000

(65) Prior Publication Data
US 2001/0023807 A1 Sep. 27, 2001

(30) Foreign Application Priority Data
Dec. 8, 1999 (GB) ............................... 9928891

(51) Int. Cl.[7] ................. F16D 23/02; F16D 23/04
(52) U.S. Cl. ..................... 192/53.34; 74/339
(58) Field of Search .............. 192/53.34, 53.3, 192/53.32, 53.1; 74/339

(56) References Cited

U.S. PATENT DOCUMENTS

| | | | |
|---|---|---|---|
| 4,289,223 A | 9/1981 | Strehler | 192/48.91 |
| 4,425,990 A | 1/1984 | Griesser | 192/53 G |
| 4,821,591 A * | 4/1989 | Adler | 192/53.34 |
| 4,836,348 A | 6/1989 | Knodel et al. | 192/53 F |
| 5,078,245 A | 1/1992 | Nellums et al. | 192/53 E |
| 5,547,057 A * | 8/1996 | Sperber | 192/53.34 |
| 5,782,331 A * | 7/1998 | Bailly et al. | 192/53.32 |

FOREIGN PATENT DOCUMENTS

| | | | |
|---|---|---|---|
| EP | 0652385 | 5/1995 | F16D/23/06 |
| EP | 0834666 | 4/1998 | F16D/23/06 |
| GB | 1502346 | 3/1978 | F16D/23/06 |
| GB | 2241542 | 9/1991 | F16D/23/00 |
| IT | 554047 | 1/1957 | |

* cited by examiner

Primary Examiner—Saul Rodriguez
(74) Attorney, Agent, or Firm—Paul S. Rulon; Kevin M. Hinman; Howard D. Gordon

(57) ABSTRACT

A baulkring-type synchronizer (18) for frictionally synchronizing and positive connecting gears (14,16) to a shaft (12). The synchronizer includes a cone clutch surfaces (24,48) and (26,50) which are engaged by an operator shift force and limit means (54,56) producing a counter force for decreasing the amount of operator shift force transmitted to cone clutch friction surfaces in response to the synchronizing torque exceeding a predetermined amount.

20 Claims, 2 Drawing Sheets

SYNCHRONIZER

FIELD OF THE INVENTION

This invention relates to a synchronizer having means to limit synchronizing force.

BACKGROUND OF THE INVENTION

Synchronizers for use in multi-ratio transmissions are well known. Such synchronizers include pairs of friction and jaw members for respectively synchronizing and positive clutching a gear to a shaft, pre-energizer assemblies for engaging the friction members in response to initial engaging movement of a shift sleeve, a hub rotatably fixed to the shaft and having external spline teeth slidably receiving internal spline teeth of the shift sleeve which often defines one of the jaw member pairs, blockers for arresting engaging movement of the shift sleeve until synchronization is reached and for transferring a shift force from the sleeve to increase the engaging force of the friction members.

SUMMARY OF THE INVENTION

An object of this invention is to provide a synchronizer with means to prevent excessive pressure on friction surfaces therein.

According to a feature of the invention, a synchronizer for frictionally synchronizing and positive connecting first and second drives is disposed for relative rotation about a common axis. The synchronizer comprising first jaw means axially movable from a neutral position into an engaged position with second jaw means for positive connecting the drives in response to engaging movement of the first jaw means by an axially directed first shift force. A first friction member is axially movable into frictional engagement with a second friction member in response to the engaging movement of the first jaw means for producing a first synchronizing torque. First and second blocker means prevent asynchronous engagement of the jaw means and transmit the shift force to the first and second friction members.

The improvement is characterized by first limit means producing a first counter force for decreasing the amount of the first shift force transmitted to the first and second friction members in response to the synchronizing torque exceeding a first predetermined amount.

BRIEF DESCRIPTION OF THE DRAWINGS

The synchronizer mechanism of the invention is shown in the accompanying drawings in which.

DETAILED DESCRIPTION OF THE DRAWINGS

The term "synchronizer" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch.

Figure 1:
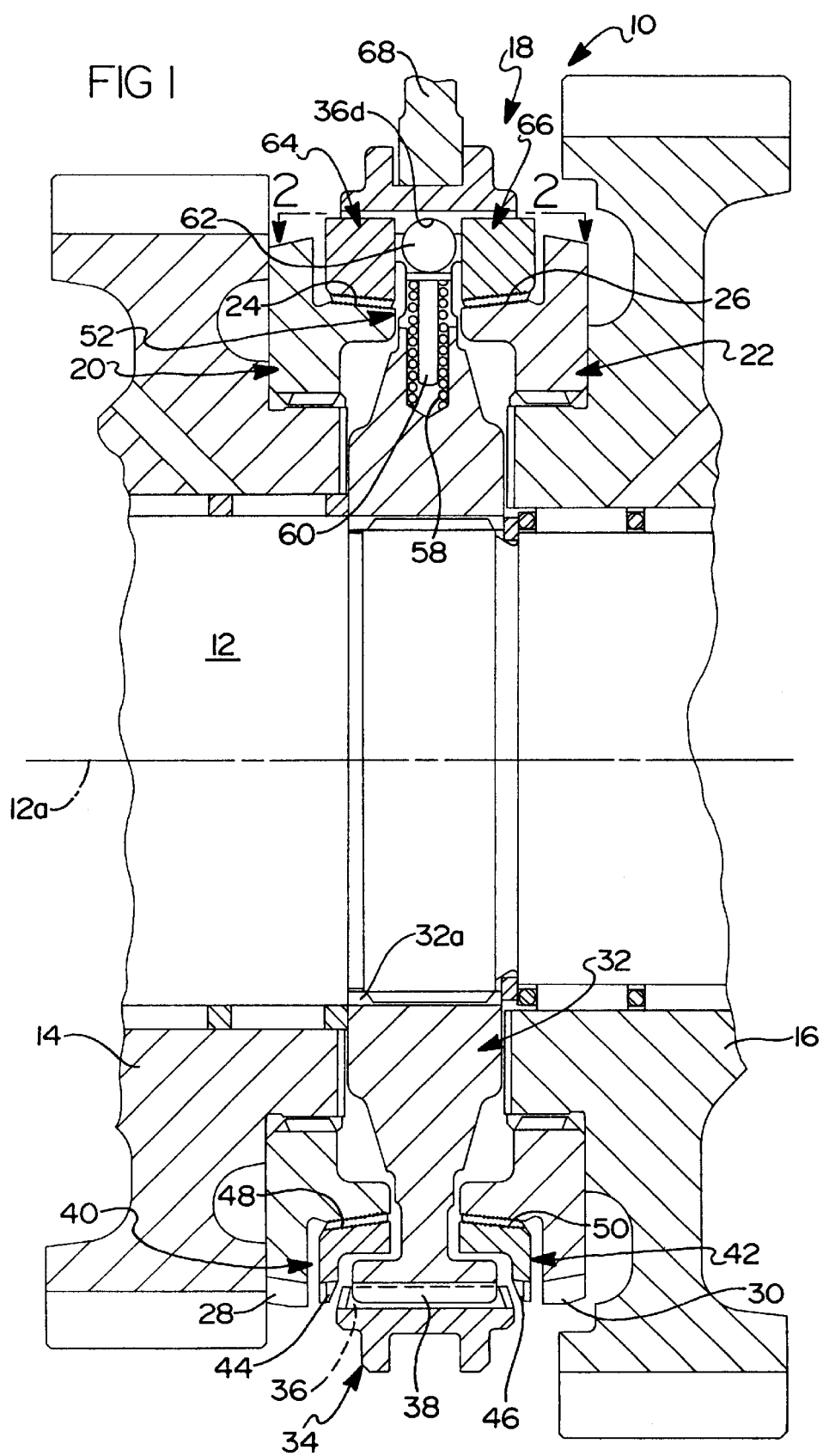
FIG. 1 is a sectional view of a double-acting synchronizer mechanism in a neutral position.
Figure 2:
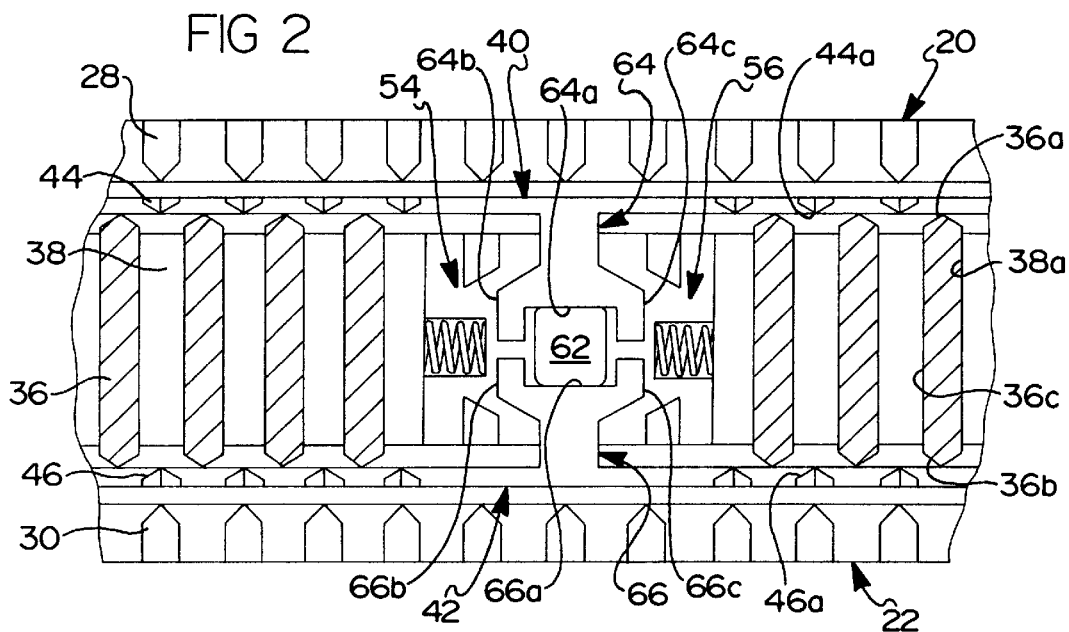
FIG. 2 is a schematic view looking radially inward along line 2—2 in FIG. 1 with components therein in the neutral position.
Figure 3:
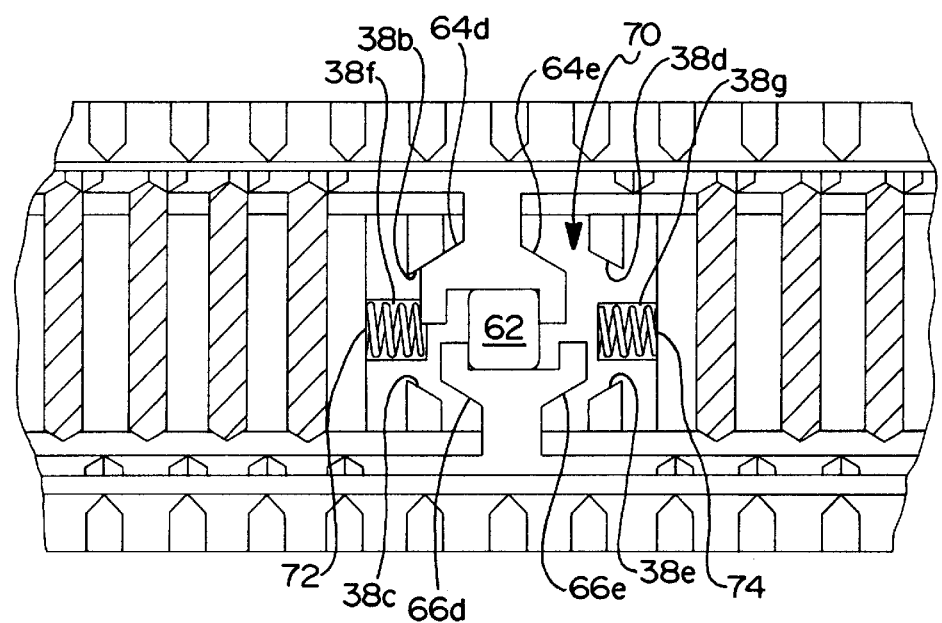
FIG. 3 is a schematic view, as is in FIG. 2, with components therein in synchronizing mode of operation.

Looking now at FIGS. 1–3, therein is shown a gear and synchronizer 10 including a shaft or drive 12 mounted for rotation about a central axis 12a, axially spaced apart gears or drives 14,16 supported on the shaft for rotation relative thereto and secured against axial movement relative to the shaft in known manner, and a double-acting synchronizer clutch mechanism 18.

The synchronizer clutch mechanism 18 includes annular members 20,22 axially and rotatably affixed to gears or drives 14, 16 in known manner, friction surfaces 24, 26 defining gear friction members herein integral with members 20,22, jaw teeth 28,30 defining gear jaw members herein integral with members 20,22, a hub member 32 axially and rotatably affixed at a central opening 32a thereof to shaft 12, a shift sleeve 34, internal spline teeth 36 on a central opening of sleeve 34 and in constant mesh with external spline teeth 38 defined on the outer circumference of hub 32, baulkrings 40,42, blocker teeth 44,46 and friction surfaces 48, 50 herein integral with baulkrings 40,42, a plurality of pre-energizer assemblies 52 (herein three with one shown), and a plurality of pairs of upshift and downshift force limiting assemblies 54,56 (herein three with one shown) to limit the engagement force of the friction surfaces.

As is readily seen, friction surfaces 24,48 and 26,50 pair up to define friction clutches for synchronizing the gears to the shaft prior to engagement of the jaw clutch members. Cone clutches are preferred; however, other types of friction clutches may be used. A wide range of cone angles may be used. The friction surfaces may be defined by any of several known friction materials affixed to the base member, e.g., pyrolytic carbon friction materials such as disclosed in U.S. Pat. Nos. 4,700,823; 4,844,218 and 4,778,548 may be used.

Opposite ends of shift sleeve spline teeth 36 include angled blocker surfaces 36a, 36b which cooperate with mating angled blocker surfaces 44a, 46a of baulkring teeth 44, 46 for preventing asynchronous engagement of the jaw clutches, for transmitting shift forces to the cone clutch friction surfaces to effect an engagement force producing a synchronizing torque, and for producing a torque counter to the synchronizing torque for moving the blocker teeth out of engagement as synchronization is reached and thereby allowing spline teeth 36 defining axially movable jaw members to engage teeth 28 or 30 of the gear jaw members.

Spline teeth 36 and 38 have axially extending flank surfaces 36c, 38a which continuously mate in close sliding relation so that there is relatively no free play between shift sleeve 34 and shaft 12. End portions of the flank surfaces of splines 36 and flank surfaces of gear jaw teeth 28, 30 may be provided with an anti-back out or locking angle feature to prevent inadvertent disengagement of the teeth. Details of this feature may be seen by reference to U.S. Pat. No. 4,727,968.

Each pre-energizer assembly 52, which is known in the art, includes a helical compression spring 58 and plunger 60 disposed in a radially extending blind bore and biasing a roller or ball 62 (herein a roller) into an annular detent groove 36d in sleeve splines 36. Pre-energizer assembly 52 resiliently positions shift sleeve 34 in the neutral position shown in FIGS. 1 and 2. Rollers 62 are axially spaced between abutment surfaces 64a, 66a of tabs 64, 66 formed integral with baulkrings 40, 42. When it is desired to couple either gear to the shaft, an appropriate and unshown shift mechanism, such as disclosed in U.S. Pat. No. 4,920,815 applies a shift force to move the shift sleeve axially via a partially shown shift fork 68 along the axis of shaft 12 either left to couple gear 14 or right to couple gear 16. The shift mechanism may be manually moved by an operator through an unshown linkage system.

The force limiting means 54,56 include recesses 70 (herein three circumferentially spaced apart recess) in the outer circumference of hub 32 and having circumferentially spaced apart ends defined by pairs of ramp surfaces 38b, 38c and 38d, 38e which respectively engage surfaces 64d,66d and 64e,66e of shoulders 64b,66b,64c,66c to limit the amount of operator shift force engaging the friction members in response to the synchronizing torque exceeding a predetermined amount. The pairs of surfaces 38b,38c and 38d,38e are respectively separated by pockets 38f, 38g respectively having preloaded springs 72,74 disposed therein and operative to yieldably contact the shoulders 64b,66b and 64c,66c which are rigid with tabs 64,66 and respectively with baulkrings 40,42.

Initial leftward axial movement of shift sleeve 34 by the operator shift force is transmitted by pre-energizer rollers 62 to baulkring 40 via tab abutment surfaces 64a to effect initial frictional engagement of movable cone surface 48 with gear cone surface 24. The initial engagement force of the cone surface is, of course, a function of the force of spring 58 and the angles of the walls of detent grooves 36d. The initial frictional engagement (provided an asynchronous condition exists) produces an initial cone clutch is engaging force and synchronizing torque which ensures limited relative rotation between shift sleeve 34 and baulkring 40, and hence, movement of blocker teeth 44 to a position wherein the correct angled blocker surfaces of the blocker teeth engage the correct angled blocker surfaces of spline teeth 36. When the blocker surfaces are engaged, the full operator shift force on shift sleeve 34 is transmitted to friction surfaces 24,48 via angled blocker surfaces 36a,44a, whereby the cone clutch is engaged by the full force of the operator shift force to provide the corresponding synchronizer torque. Since the blocker surfaces are disposed at angles relative to the axial direction of operator shift force, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker teeth move out of engagement to allow continued axial movement of the shift sleeve and engagement of movable jaw teeth 36 with gear jaw teeth 28. Rightward movement of shift sleeve 34 to connect gear 16 to shaft 12 produces a sequences of functions substantially the same as above.

During some upshifts and/or downshifts the operator shift force may be great enough to damage the synchronizer. For example the friction surfaces of the friction members may be damaged if the shift force is excessive and/or if there are high differential speeds between the engaged friction surfaces. The force limiting means provides a force counter to operator shift force to limit the engaging force of the friction surfaces when the torque provided by the engaged friction surfaces exceeds a predetermined amount determined by the force of springs 72 and 74. Since the force limiting means operates the same for upshift and downshift of both gears, only operation of an upshift of gear 14 is described. During an upshift synchronizing mode of operation of gear 14, torque build up across the engaged friction surfaces causes shoulder 64b to act on spring 72. When the torque exceeds a predetermined amount, spring 72 is compressed enough to allow surface 64d to contact ramp surface 38b. Any further increase via torque causes the surface 64d to move down ramp surface 38b thereby moving friction surface 48 away from friction surface 24 and reducing the engaging force therebetween to a predetermined amount. When torque reduces to the predetermined amount or less, spring 72 extends and causes surface 64d to brake contact with ramp surface 38b.

A preferred embodiment of a synchronizer is disclosed. The following claims are intended to cover the inventive portions of the disclosed synchronizer.

What is claimed is:

1. A synchronizer for frictionally synchronizing and positive connecting first and second drives disposed for relative rotation about a common axis; the clutch comprising:

first jaw means axially movable from a neutral position into an engaged position with second jaw means for positive connecting the drives in response to engaging movement of first jaw means by an axially directed first shift force;

a first friction member axially movable into frictional engagement with a second friction member in response to the engaging movement of the first jaw means for producing a first synchronizing torque;

first and second blocker means for preventing asynchronous engagement of the jaw means and for transmitting the shift force to the first and second friction members; characterized by:

first limit means producing a first counter force for decreasing the amount of the first shift force transmitted to the first and second friction members in response to the synchronizing torque exceeding a first predetermined amount.

2. The synchronizer of claim 1, further including a third drive disposed for rotation about the common axis and for rotation relative to the first and second drives and axially spaced from the second drive;

third jaw means axially movable from a neutral position into an engaged position with fourth jaw means for positive connecting the drives in response to engaging movement of first jaw means by an axially directed second shift force;

a third friction member axially movable into frictional engagement with a fourth friction member in response to the engaging movement of the third jaw means for producing a second synchronizing torque;

third and fourth blocker means for preventing asynchronous engagement of the third and fourth jaw means and for transmitting the second shift force to the third and fourth friction members;

second limit means producing a second counter force for decreasing the amount of the second shift force transmitted to the third and fourth friction members in response to the second synchronizing torque exceeding a second predetermined amount.

3. The synchronizer of claim 1, wherein:

the first limit means include resilient means for preventing the first counter force until the first synchronizing torque exceeds the predetermined amount.

4. The synchronizer of claim 3, wherein:

the first limit means include first and second surfaces operative when engaged to produce the first counter force.

5. The synchronizer of claim 4, wherein:

the first and second surfaces respectively react between the first friction member and the first drive; and the resilient means prevent engagement of the first and second surfaces until the first synchronizing torque in one direction exceeds the first predetermined amount.

6. The synchronizer of claim 5, wherein:

a hub is affixed against rotational and axial movement relative to the first drive and includes an outer circumference having a plurality of external splines;

the first jaw means includes internal splines slidably mating with the external splines;

a first baulkring includes the first friction member and the second blocker means;

the hub further including a recess having first and second circumferentially spaced apart ends with at least one of the ends defining the second surface; and the first baulkring includes the first surface affixed thereto.

7. The synchronizer of claim 6, wherein:

the first limit means includes third and fourth surfaces respectively defined by the first baulkring and the second end of the recess and second resilient means for preventing engagement of the third and fourth surfaces until the first synchronizing torque in a direction opposite the one direction exceeds the first predetermined amount.

8. The synchronizer of claim 7, wherein:

the internal splines have axially facing ends defining the first blockers.

9. The synchronizer of claim 2, wherein:

the second limit means include resilient means for preventing the second counter force until the second synchronizing torque in one direction exceeds the second predetermined amount.

10. The synchronizer of claim 9, wherein:

the second limit means includes fifth and sixth surfaces operative when engaged to produce the second counter force.

11. The synchronizer of claim 10, wherein:

the fifth and sixth surfaces respectively react between the third friction member and the first drive; and the resilient means prevent engagement of the fifth and sixth surfaces until the second synchronizing torque exceeds the second predetermined amount.

12. The synchronizer of claim 11, wherein:

the third jaw means includes internal splines slidably mating with the external splines;

a second baulkring includes the third friction member and the fourth blockers;

the hub recess first end defines the sixth surface; and the second baulkring includes the fifth surface affixed thereto.

13. The synchronizer of claim 12, wherein:

the second limit means includes seventh and eight surfaces respectively defined by the second baulkring and the second end of the recess and second resilient means for preventing engagement of the seventh and eight surfaces until the first synchronizing torque in a direction opposite the one exceeds the first predetermined amount.

14. The synchronizer of claim 13, wherein:

the third jaw means internal splines have axially facing ends defining the third blockers.

15. The synchronizer of claim 2, wherein:

the first limit means include resilient means for preventing the first counter force until the first synchronizing torque exceeds the predetermined amount; and the second limit means include resilient means for preventing the second counter force until the second synchronizing torque in one direction exceeds the second predetermined amount.

16. The synchronizer of claim 15, wherein:

the first limit means include first and second surfaces operative when engaged to produce the first counter force; and the second limit means includes fifth and sixth surfaces operative when engaged to produce the second counter force.

17. The synchronizer of claim 16, wherein:

the first and second surfaces respectively react between the first friction member and the first drive;

the resilient means prevent engagement of the first and second surfaces until the first synchronizing torque in one direction exceeds the first predetermined amount;

the fifth and sixth surfaces respectively react between the third friction member and the first drive; and the resilient means prevent engagement of the fifth and sixth surfaces until the second synchronizing torque exceeds the second predetermined amount.

18. The synchronizer of claim 17, wherein:

a hub is affixed against rotational and axial movement relative to the first drive and includes an outer circumference having a plurality of external splines;

the first jaw means includes internal splines slidably mating with the external splines;

a first baulkring includes the first friction member and the second blocker means;

the hub further including a recess having first and second circumferentially spaced apart ends with at least one of the ends defining the second surface;

the first baulkring includes the first surface affixed thereto;

the third jaw means includes internal splines slidably mating with the external splines;

a second baulkring includes the third friction member and the fourth blockers;

the hub recess first end defines the sixth surface; and the second baulkring includes the fifth surface affixed thereto.

19. The synchronizer of claim 18, wherein:

the first limit means includes third and fourth surfaces respectively defined by the first baulkring and the second end of the recess and second resilient means for preventing engagement of the third and fourth surfaces until the first synchronizing torque in a direction opposite the one direction exceeds the first predetermined amount; and the second limit means includes seventh and eight surfaces respectively defined by the second baulkring and the second end of the recess and second resilient means for preventing engagement of the seventh and eight surfaces until the first synchronizing torque in a direction opposite the one exceeds the first predetermined amount.

20. The synchronizer of claim 19, wherein:

the internal splines have axially oppositely facing ends defining the first and second blockers.

* * * * *